US012797959B2

(12) United States Patent
Morjan Brenning et al.

(10) Patent No.: US 12,797,959 B2
(45) Date of Patent: Nov. 17, 2026

(54) CUTTING TOOL

(71) Applicant: AB SANDVIK COROMANT, Sandviken (SE)

(72) Inventors: Raluca Morjan Brenning, Sandviken (SE); Linus Von Fieandt, Sandviken (SE); Jan Engqvist, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 367 days.

(21) Appl. No.: 18/287,374

(22) PCT Filed: Apr. 22, 2022

(86) PCT No.: PCT/EP2022/060698

§ 371 (c)(1),
(2) Date: Oct. 18, 2023

(87) PCT Pub. No.: WO2022/223786

PCT Pub. Date: Oct. 27, 2022

(65) Prior Publication Data

US 2024/0207943 A1 Jun. 27, 2024

(30) Foreign Application Priority Data

Apr. 23, 2021 (EP) .................................... 21170080

(51) Int. Cl.
*B23B 27/14* (2006.01)

(52) U.S. Cl.
CPC ........ *B23B 27/148* (2013.01); *B23B 2224/32* (2013.01); *B23B 2228/04* (2013.01); *B23B 2228/105* (2013.01); *B23B 2228/36* (2013.01)

(58) Field of Classification Search
CPC .............. B23B 27/148; B23B 2224/32; B23B 2228/04; B23B 2228/105; B23B 2228/36; C23C 16/34; C23C 16/36; C23C 16/52; C23C 28/004; C23C 30/005; C23C 16/0272
See application file for complete search history.

(56) References Cited

U.S. PATENT DOCUMENTS

| | | | | |
|---|---|---|---|---|
| 6,472,060 | B1 * | 10/2002 | Ruppi | C23C 16/30 428/323 |
| 2005/0013995 | A1 | 1/2005 | Ruppi | |
| 2014/0308083 | A1 | 10/2014 | Bjormander | |

FOREIGN PATENT DOCUMENTS

| | | | | |
|---|---|---|---|---|
| EP | 1118688 A1 * | 7/2001 | | C23C 16/30 |
| JP | 2014128837 A * | 7/2014 | | C23C 16/36 |

(Continued)

OTHER PUBLICATIONS

L. von Fieandt et al, "On the growth, orientation and hardness of chemical vapor deposited Ti(C,N)", 2018, Thin Solid Films, vol. 645, pp. 19-26 (Year: 2018).*

(Continued)

*Primary Examiner* — Jacob J Cigna
(74) *Attorney, Agent, or Firm* — Corinne R. Gorski

(57) ABSTRACT

A cutting tool for metal cutting includes a substrate at least partially coated with a 3-30 μm coating. The substrate is of cemented carbide, cermet or ceramic. The coating includes one or more layers, wherein at least one layer is a Ti(C,N) layer having a thickness of 3-25 μm. The Ti(C,N) layer is composed of columnar grains with a mean grain size ≥25 nm and ≤35 nm.

8 Claims, 6 Drawing Sheets

(56) References Cited

FOREIGN PATENT DOCUMENTS

| | | | | | |
|---|---|---|---|---|---|
| JP | 2019171547 | A | | 10/2019 | |
| WO | WO-2021038060 | A1 | * | 3/2021 | ............... B23B 1/00 |

OTHER PUBLICATIONS

Anongsack et al.: "Microstructure, mechanical properties, and cutting performance of TiC x N 1-x coatings with various x values fabricated by moderate termperature chemical vapor deposition", Surface and Coatings Technology, vol. 260, Dec. 1, 2014, pp. 139-147.

Ruppi et al. "Deposition, microstructure, and properties of nanocrystalline Ti (C, O, N) coatings", Journal of Vacuum Science and Technology: Part A, AVS/AIP, Melville, NY, US. vol 21, No. 1, Jan. 1, 2003, pp. 66-75.

* cited by examiner

CUTTING TOOL

RELATED APPLICATION DATA

This application is a § 371 National Stage Application of PCT International Application No. PCT/EP2022/060698 filed Apr. 22, 2022 with priority to EP 21170080.2 filed Apr. 23, 2021.

TECHNICAL FIELD

The present invention relates to a coated cutting tool comprising a substrate and a coating, wherein the coating comprises a Ti(C,N) layer with an average grain size between 25 nm and 35 nm.

BACKGROUND

In the technical area of cutting tools for metal machining, the usage of CVD coatings is a well-known method to enhance the wear resistance of the tools. CVD coatings of ceramic materials such as TiN, TiC, Ti(C,N) and $Al_2O_3$ are commonly used.

EP2791387 discloses a coated cutting tool provided with a fine-grained titanium carbonitride layer. The coating is advantageous in showing high resistance to flaking in turning of nodular cast iron and in high speed cutting. A columnar MTCVD Ti(C,N) layer is described with an average grain width of 0.05-0.4 μm.

There is a continuous need of finding cutting tool coatings that can prolong the lifetime of the cutting tool and/or that can withstand higher cutting speeds than the known cutting tool coatings.

SUMMARY OF THE INVENTION

One object of the present invention is to provide a coated cutting tool with improved resistance to wear in metal cutting applications. A further object is to improve its resistance in turning operations, especially in turning of steel and hardened steel. It is a further object to provide a wear resistant coating that provides a high crater and flank wear resistance in turning of steel and hardened steel.

At least one of these objects is achieved with a coated cutting tool according to claim 1.

Preferred embodiments are listed in the dependent claims.

The present disclosure relates to a cutting tool for metal cutting, wherein said cutting tool comprise a substrate at least partially coated with a 3-30 μm coating, said substrate is of cemented carbide, cermet or ceramic, said coating comprise one or more layers, wherein at least one layer is a Ti(C,N) layer with a thickness of 3-25 μm, wherein said Ti(C,N) layer being composed of columnar grains wherein the average grain size D422 of the Ti(C,N) layer, as measured with X-ray diffraction with CuKα radiation, the grain size $D_{422}$ is calculated from the full width at half maximum (FWHM) of the (422) peak according to Scherrer's equation:

$$D_{422} = \frac{K\lambda}{B_{422}\cos\theta}$$

wherein $D_{422}$ is the mean grain size of the Ti(C,N) grains in the Ti(C,N) layer, K is the shape factor here set at 0.9, λ is the wavelength for the $CuK\alpha_1$ radiation here set at 1.5405 Å, $B_{422}$ is the FWHM value for the (422) reflection and θ is the Bragg angle, wherein $D_{422}$ is ≥25 nm and ≤35 nm.

It has surprisingly been found that a cutting tool provided with a very fine grained Ti(C,N) layer shows a very high resistance to wear when used in metal cutting applications such as turning in high alloyed steel. It is believed that the combination of a crystallinity and columnar grains with a high amount of grain boundaries contributes to the high wear resistance.

In one embodiment of the present invention said at least one Ti(C,N) layer exhibits an X-ray diffraction pattern, as measured using CuKα radiation and θ-2θ scan, wherein the TC(hkl) is defined according to Harris formula:

$$TC(hkl) = \frac{I(hkl)}{I_0(hkl)}\left[\frac{1}{n}\sum_{n=1}^{n}\frac{I(hkl)}{I_0(hkl)}\right]^{-1}$$

where I(hkl) is the measured intensity (integrated area) of the (hkl) reflection, 10 (hkl) is the standard intensity according to ICDD's PDF-card No. 42-1489, n is the number of reflections, reflections used in the calculation are (1 1 1), (2 0 0), (2 2 0), (3 1 1), (3 3 1), (4 2 0) and (4 2 2), wherein TC(422)≥3.

In one embodiment of the present invention the said at least one Ti(C,N) layer is 6-25 μm in thickness and exhibits an X-ray diffraction pattern, wherein TC(422)≥4.

In one embodiment of the present invention the said at least one Ti(C,N) layer is 4.5-25 μm in thickness and exhibits an X-ray diffraction pattern, wherein TC(422) is the highest and TC(311) is the second highest. In one embodiment of the present invention the ratio C/(C+N) in the Ti(C,N) layer is 50% to 70%, preferably 55% to 65%. This composition is advantageous in that this Ti(C,N) layer shows a high chemical stability.

In one embodiment of the present invention the coating comprises an innermost layer of TiN.

In one embodiment of the present invention the Ti(C,N) layer is the outermost layer of the coating.

The present invention also relates to the use of the cutting tools described above in metal cutting.

In one embodiment of the present invention the cutting tool is used in metal cutting in high alloyed steel, hardened steel, cast iron or stainless steel, preferably used in metal cutting in high alloyed steel.

In one embodiment of the present invention the cutting tool is a drill, a milling insert or a turning insert, preferably a turning insert.

The coated cutting tools described herein can be subjected to post-treatments such as blasting, brushing or shot peening in any combination. A blasting post-treatment can be wet blasting or dry blasting for example using alumina particles.

Still other objects and features of the present invention will become apparent from the following definitions and examples considered in conjunction with the accompanying drawings.

BRIEF DESCRIPTION OF DRAWINGS

Embodiments of the invention will be described with reference to the accompanying drawings, wherein.

DEFINITIONS

Figure 1:
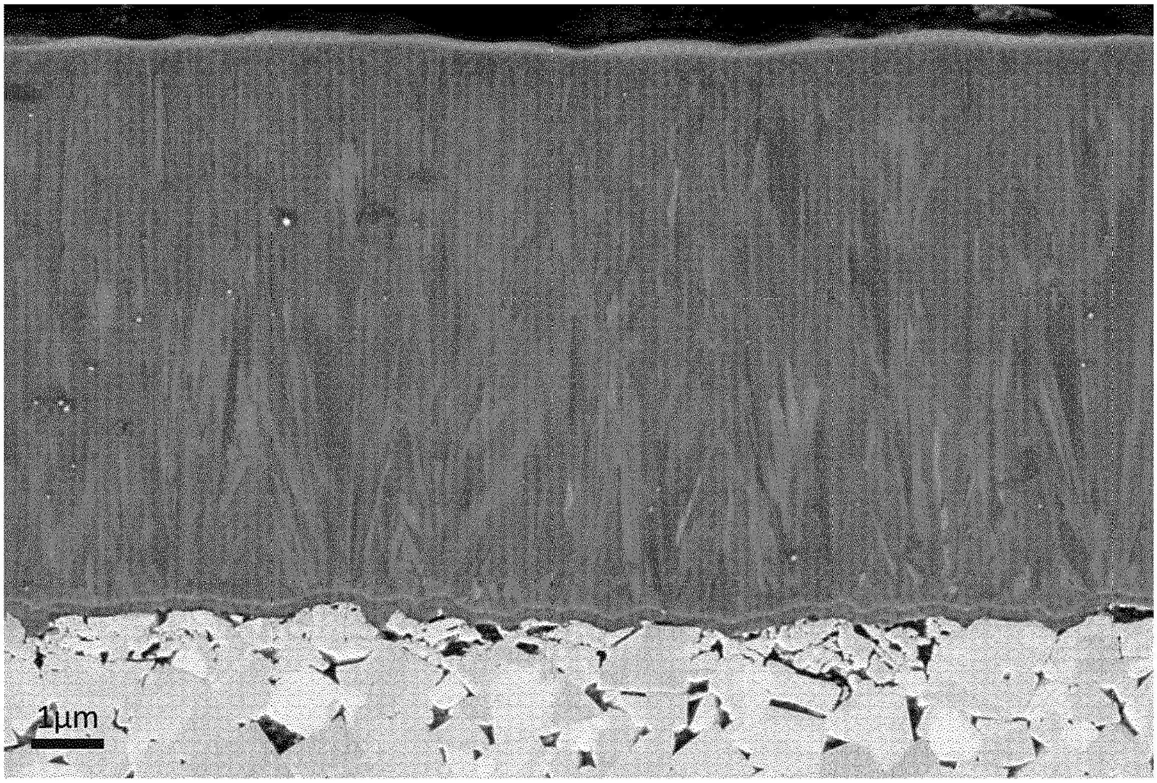
FIG. 1 shows a Scanning Electron Microscope (SEM) image of a cross section of an example of the inventive coating, sample A.

The term "cutting tool" is herein intended to denote cutting tools suitable for metal cutting applications such as inserts, end mills or drills. The application areas can for example be turning, milling or drilling in metals such as steel.

Methods

XRD

In order to investigate the texture or orientation of the layer(s) and also the average grain size, X-ray diffraction (XRD) was conducted on the flank face using a PANalytical CubiX3 diffractometer equipped with a PIXcel detector. The coated cutting tools were mounted in sample holders to ensure that the flank face of the samples are parallel to the reference surface of the sample holder and also that the flank face is at appropriate height. Cu-Kα radiation was used for the measurements, with a voltage of 45 kV and a current of 40 mA. Anti-scatter slit of ½ degree and divergence slit of ¼ degree were used. The diffracted intensity from the coated cutting tool was measured in the 2θ range 20° to 140°, i.e. over an incident angle θ range from 10 to 70°. The data analysis, including background fitting, Cu-$K\alpha_2$ stripping and profile fitting of the data, was done using PANalytical's X'Pert HighScore Plus software.

The integrated peak full width at half maximum for the profile fitted curve achieved from PANalytical's X'Pert HighScore Plus software was used to calculate the grain size of the layer according to the Scherrer equation (Eq1) (Birkholz, 2006).

The average grain size $D_{422}$ is calculated from the full width at half maximum (FWHM) of the (422) peak according to Scherrer's equation:

$$D_{422} = \frac{K\lambda}{B_{422}\cos\theta}$$

wherein $D_{422}$ is the mean grain size of the Ti(C,N), K is the shape factor here set at 0.9, λ is the wave length for the $CuK\alpha_1$ radiation here set at 1.5405 Å, B is the FWHM value for the (422) reflection and θ is the Bragg angle i.e the incident angle.

β is the line broadening (in radians) at FWHM after subtracting the instrumental broadening (0,00174533 radians), θ is the incident angle. For the calculation of the broadening with subtraction of the instrumental broadening, a Gaussian approximation was used (Eq2)(Birkholz, 2006):

$$\beta=\sqrt{((FWHM_{obs})^2-(FWHM_{ins})^2)}$$

Where β is the real broadening (in radians) used for the grain size calculation, $FWHM_{obs}$ is the measured broadening (in radians), $FWHM_{ins}$ is the instrumental broadening (in radians).

The texture or orientation of the layer(s) was defined based on the X-ray diffraction pattern, measured using CuKα radiation and θ-2θ scan, wherein the TC(hkl) was defined according to Harris formula:

$$TC(hkl) = \frac{I(hkl)}{I_0(hkl)}\left[\frac{1}{n}\sum_{n=1}^{n}\frac{I(hkl)}{I_0(hkl)}\right]^{-1}$$

where I(hkl) is the measured intensity (integrated area) of the (hkl) reflection, $I_0$(hkl) is the standard intensity according to ICDD's PDF-card No. 42-1489, n is the number of reflections, reflections used in the calculation are (1 1 1), (2 0 0), (2 2 0), (3 1 1), (3 3 1), (4 2 0) and (4 2 2).

Since possible further layers above the Ti(C,N)-layer will affect the X-ray intensities entering the Ti(C,N)-layer and exiting the whole coating, corrections need to be made for these, taken into account the linear absorption coefficient for the respective compound in a layer. Alternatively, a further layer, above the Ti(C,N)-single-layer can be removed by a method that does not substantially influence the XRD measurement results, e.g. chemical etching.

It is to be noted that peak overlap is a phenomenon that can occur in X-ray diffraction analysis of coatings comprising for example several crystalline layers and/or that are deposited on a substrate comprising crystalline phases, and this has to be considered and compensated for by the skilled person. It is also to be noted that for example WC in the substrate can have diffraction peaks close to the relevant peaks of the present invention.

Figure 2:
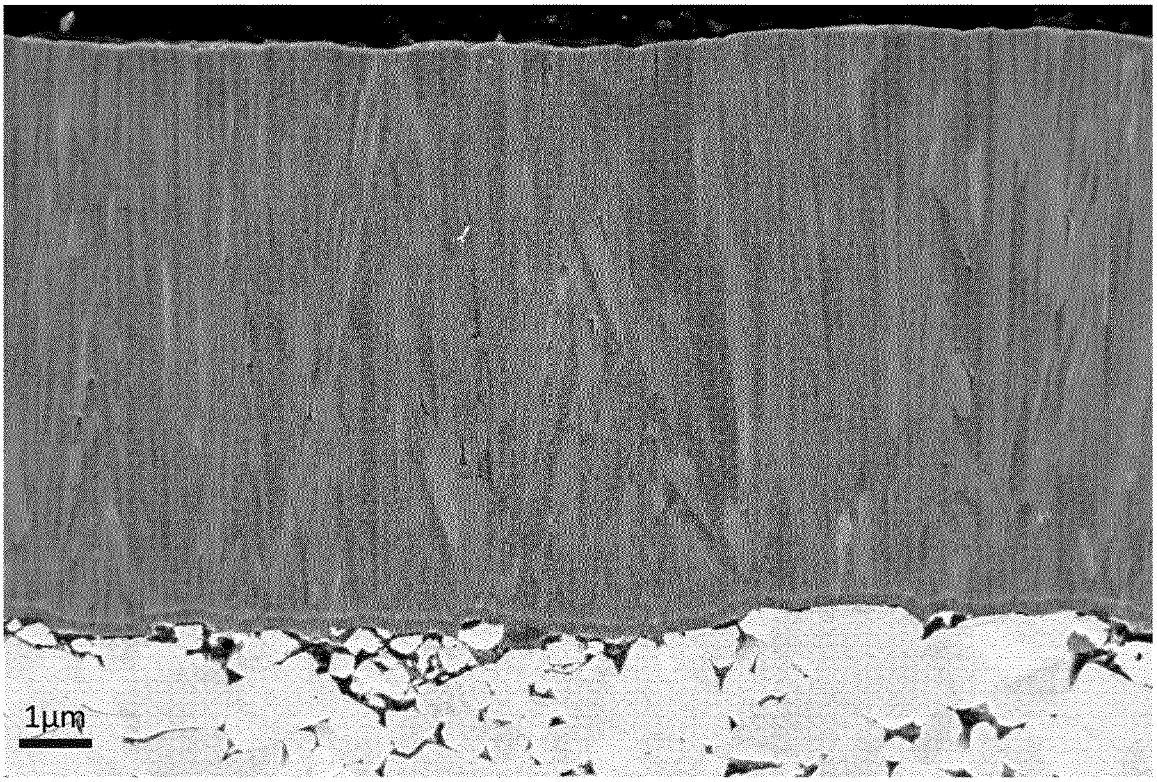
FIG. 2 shows a Scanning Electron Microscope (SEM) image of a cross section of an example of a reference coating, sample B.
Figure 3:
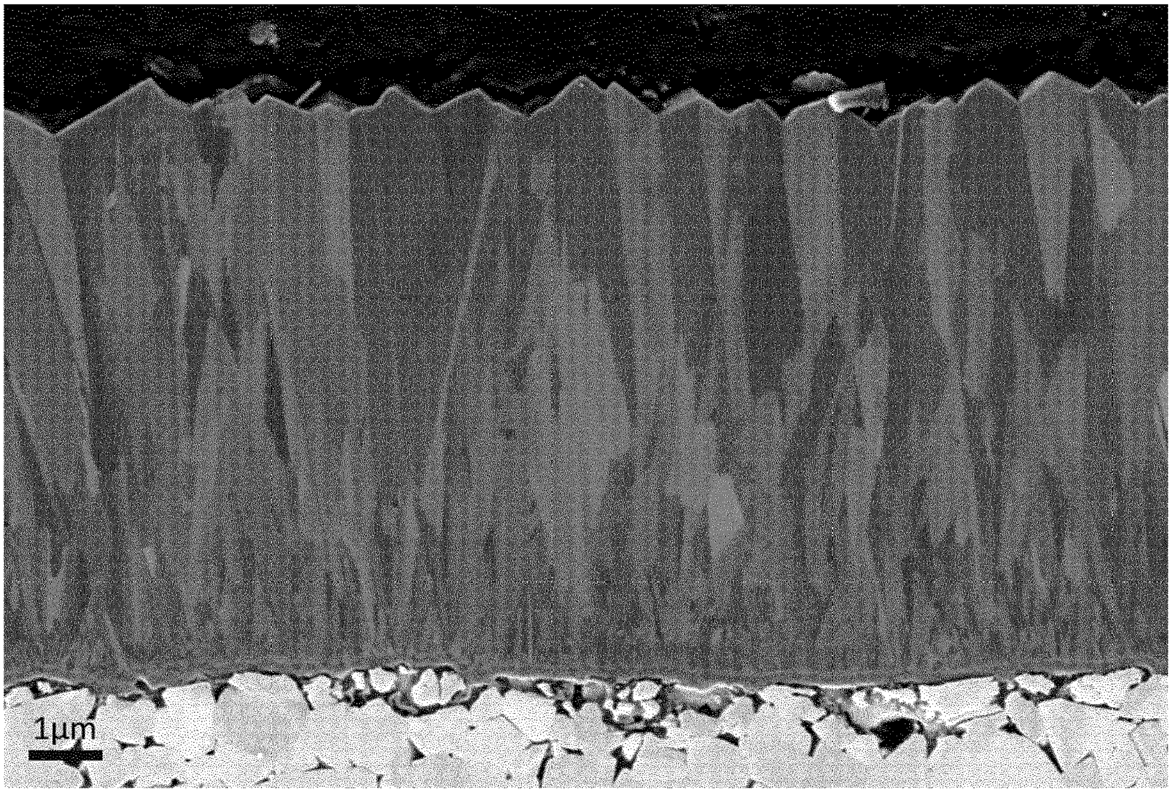
FIG. 3 shows a Scanning Electron Microscope (SEM) image of a cross section of an example of a reference coating, sample C.
Figure 4:
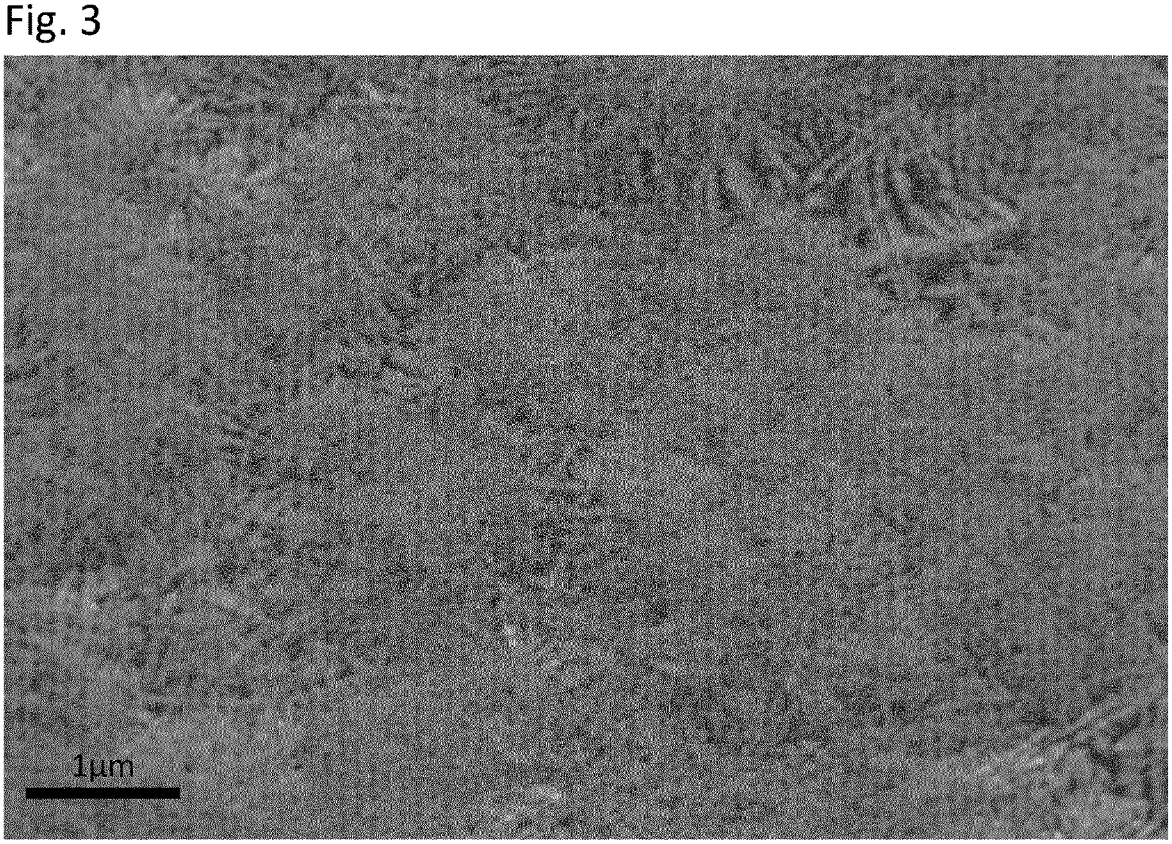
FIG. 4 shows a Scanning Electron Microscope (SEM) image of the outer surface of an example of the inventive coating, sample A.
Figure 5:
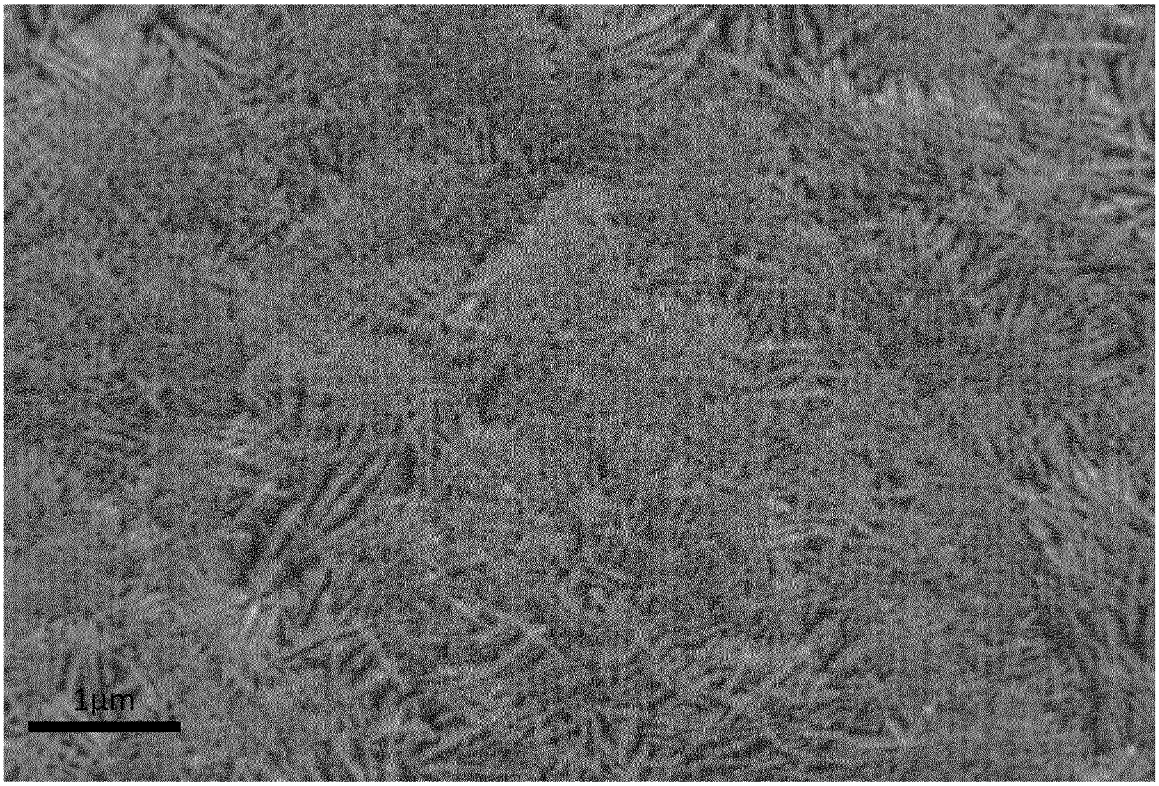
FIG. 5 shows a Scanning Electron Microscope (SEM) image of the outer surface of an example of a reference coating, sample B.
Figure 6:
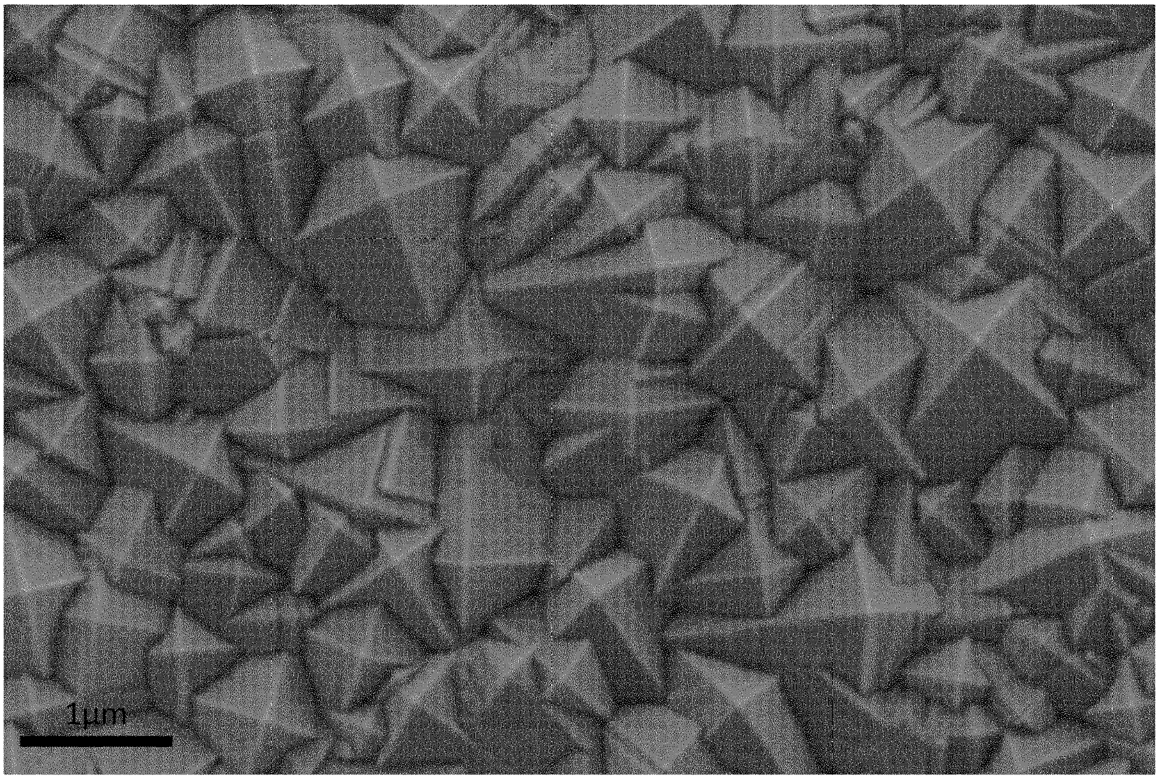
FIG. 6 shows a Scanning Electron Microscope (SEM) image of the outer surface of an example of a reference coating, sample C.

Elemental analysis is performed by electron microprobe analysis using a JEOL electron microprobe JXA-8530F equipped with wavelength dispersive spectrometer (WDS) in order to determine C/(C+N) ratio of the Ti(C,N) layers presented in FIGS. 1, 2 and 3. The analysis of the Ti(C,N) layers was conducted on polished cross section on the rake face. For each type of Ti(C,N) layer 3 samples were analyzed in 10 points with a spacing of 50 μm along a straight line parallel to the substrate surface at a distance of 4-6 μm from the interface between the substrate and the TiN layer. The data was acquired using 10 kV, 29 nA and a Ti(C,N) reference with a composition of 10.22 wt % C, 10.68 wt % N, 78.86 wt % Ti and 0.24 wt % O.

EXAMPLES

Exemplifying embodiments of the present invention will now be disclosed in more detail and compared to reference embodiments. Coated cutting tools (inserts) were manufactured, analyzed and evaluated in cutting tests.

Cemented carbide substrates were manufactured utilizing conventional processes including milling, mixing, spray drying, pressing and sintering. The sintered substrates were CVD coated in a radial CVD reactor of Ionbond Type size 530 capable of housing 10.000 half inch size cutting inserts. The substrates were placed on the plates and the samples to be tested and analysed further were selected from the middle of the chamber and at a position along half the radius of the plate. The ISO-type geometry of the cemented carbide substrates (inserts) were CNMG-120408-PM. The composition of the cemented carbide was 7.2 wt % Co, 2.9 wt % TaC, 0.5 wt % NbC, 1.9 wt % TiC, 0.4 wt % TiN and the rest WC.

CVD Depositions

A first innermost coating of about 0.2 μm TiN was deposited on all substrates in a process at 400 mbar and 885° C. A gas mixture of 48.8 vol % $H_2$, 48.8 vol % $N_2$ and 2.4 vol % $TiCl_4$ was used. Thereafter the Ti(C,N) layers were deposited as disclosed below.

On the sample A the Ti(C,N) layer was deposited in one step at 80 mbar at 870° C. in a gas mixture of 2.95 vol % $TiCl_4$, 0.45 vol % $CH_3CN$ and balance $H_2$.

On the sample B the Ti(C,N) layer was deposited in one step at 80 mbar at 830° C. in a gas mixture of 2.95 vol % $TiCl_4$, 0.45 vol % $CH_3CN$ and balance $H_2$.

On the sample C the Ti(C,N) layer was deposited in two steps, an inner Ti(C,N) and an outer Ti(C,N). The inner Ti(C,N) was deposited for 10 minutes at 55 mbar at 885° C. in a gas mixture of 3.0 vol % $TiCl_4$, 0.45 vol % $CH_3CN$, 37.6 vol % $N_2$ and balance $H_2$. The outer Ti(C,N) was deposited at 55 mbar at 885° C. in a gas mixture of 7.8 vol % $N_2$, 7.8 vol % HCl, 2.4 vol % $TiCl_4$, 0.65 vol % $CH_3CN$ and balance $H_2$.

Coating Analysis

The layer thicknesses were measured on the rake face of the cutting tool samples using light optical microscope. The layer thicknesses of the coating the samples A-C are shown in Table 1.

TABLE 1

| Layer thicknesses | | |
|---|---|---|
| Sample | Layer thickness TiN [μm] | Layer thickness Ti(C, N) [μm] |
| A | 0.2 | 9.3 |
| B | 0.2 | 8.3 |
| C | 0.2 | 9.0 |

The grain size of the Ti(C,N) layers were analysed with X-ray diffraction analysing the 422 peak as disclosed above. The ratios C/(C+N) of the Ti(C,N) layers were analysed using electron microprobe analysis as disclosed above. The resulting grain sizes and carbon contents for the samples A, B and C are presented in Table 2.

TABLE 2

| Grain sizes and carbon contents | | |
|---|---|---|
| Sample | Grain size [nm] | C/(C + N) ratio in Ti(C, N) |
| A | 33 | 60.3% |
| B | 37 | 59.5% |
| C | >67* | 55.8% |

*not correct to use Scherrer since absence of peak widening caused by small grain size The orientation of the Ti(C,N) layers were analysed using X-ray diffraction as disclosed above. The results are presented in Table 3.

TABLE 3

| Texture coefficients | | | | | | | |
|---|---|---|---|---|---|---|---|
| Sample | TC(111) | TC(200) | TC(220) | TC(311) | TC(331) | TC(420) | TC(422) |
| A | 0.31 | 0.01 | 0.20 | 1.58 | 0.64 | 0.18 | 4.08 |
| B | 0.38 | 0.01 | 0.06 | 1.71 | 0.37 | 0.14 | 4.33 |
| C | 0.41 | 0.01 | 0.07 | 1.98 | 0.41 | 0.16 | 3.96 |

Figure 7:
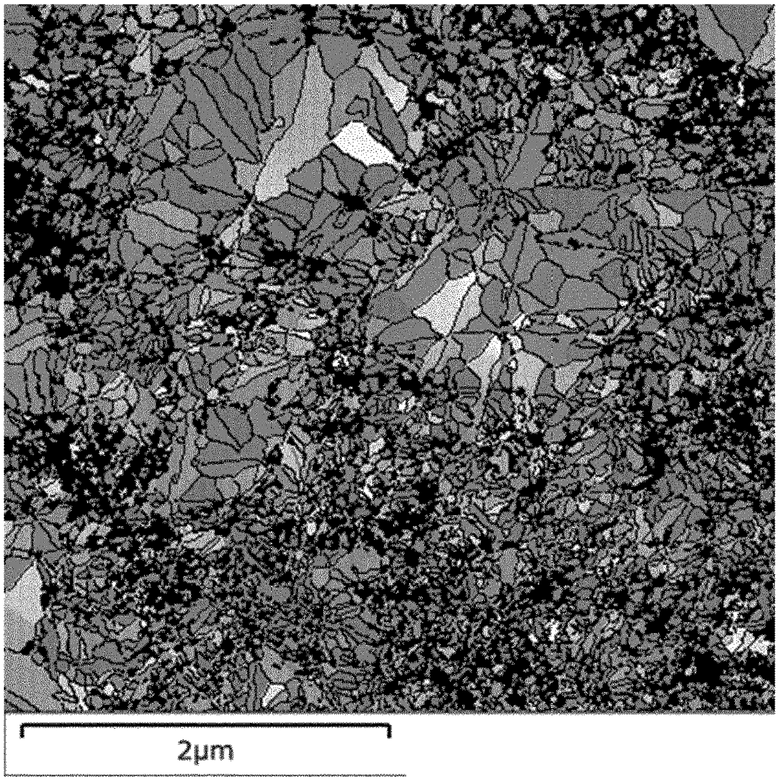
FIG. 7 shows a TKD (Transmission Kikuchi Diffraction) map of a plane view in the Ti(C,N) layer of sample A. The plane view is of a distance of about 6 μm from the substrate-coating interface.
Figure 8:
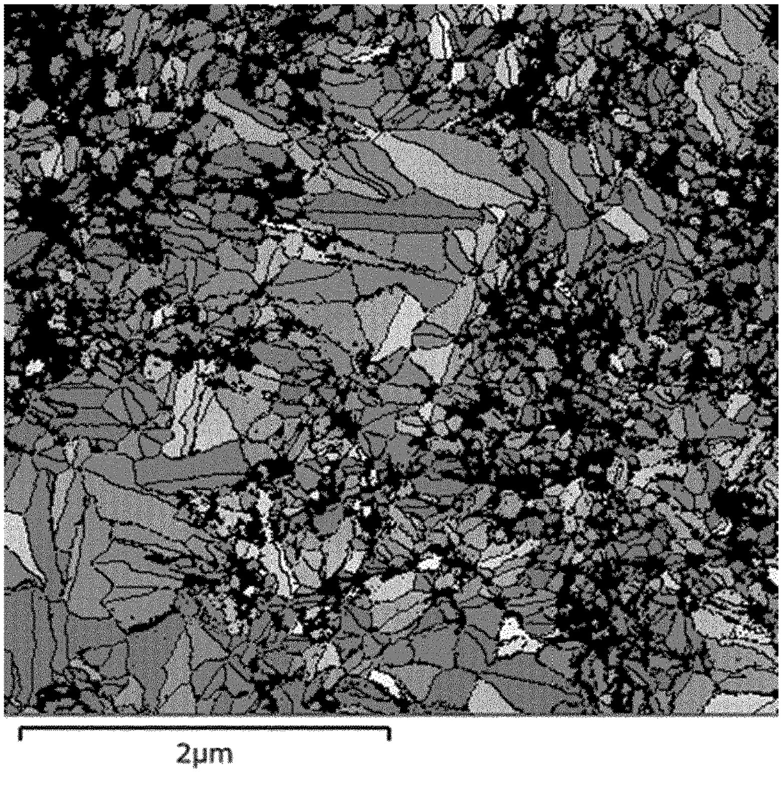
FIG. 8 shows a TKD (Transmission Kikuchi Diffraction) map of a plane view in the Ti(C,N) layer of sample B. The plane view is of a distance of about 6 μm from the substrate-coating interface.
Figure 9:
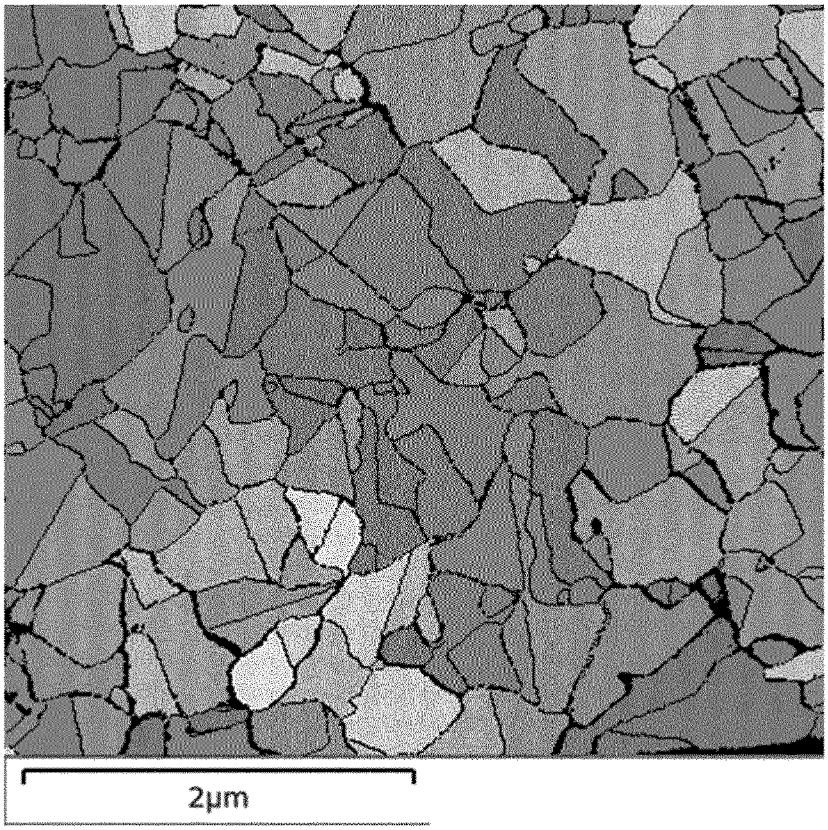
FIG. 9 shows a TKD (Transmission Kikuchi Diffraction) map of a plane view in the Ti(C,N) layer of sample C. The plane view is of a distance of about 6 μm from the substrate-coating interface.
Figure 10:
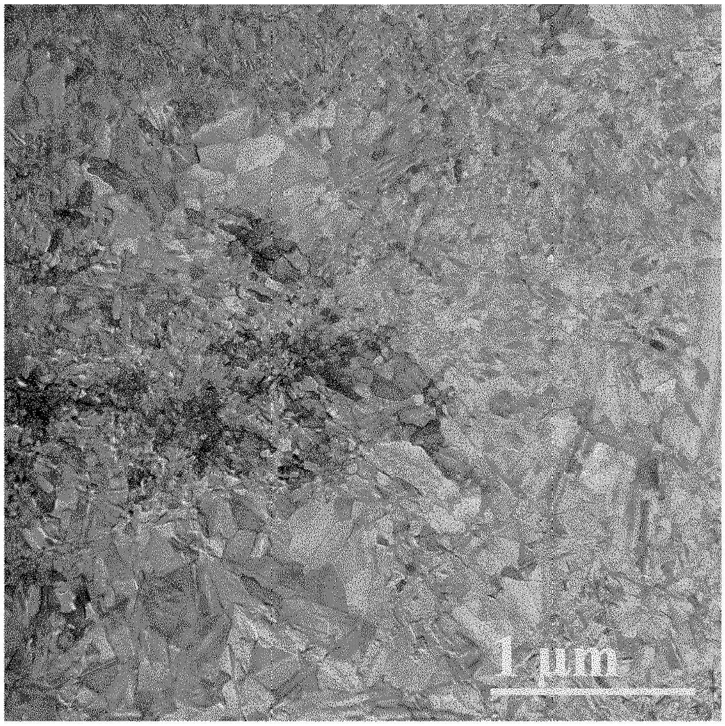
FIG. 10 shows a bright field image from a Transmission Electron Microscope (TEM) analysis of a plane view in the Ti(C,N) layer of sample A. The plane view is of a distance of about 6 μm from the substrate-coating interface.
Figure 11:
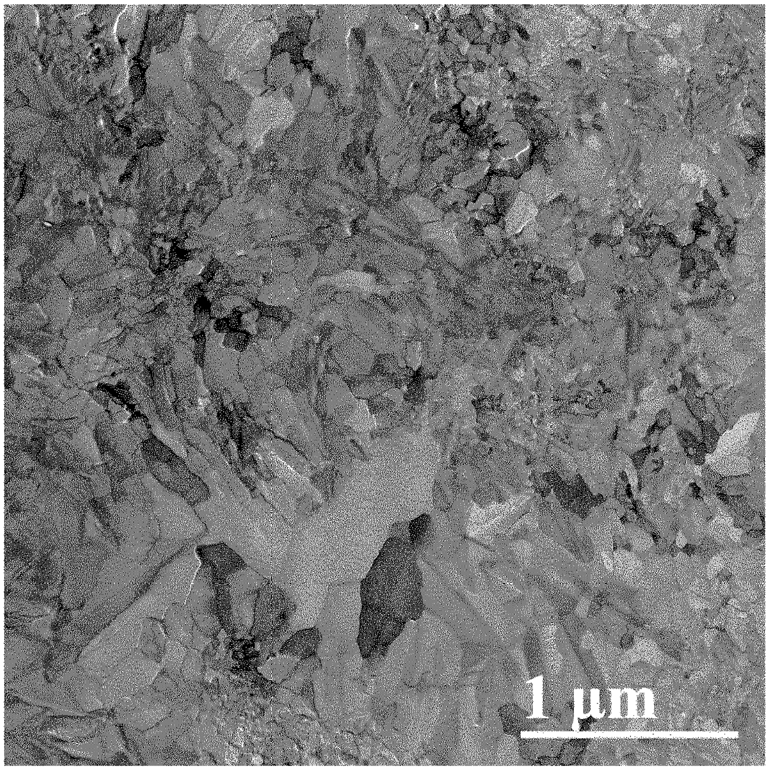
FIG. 11 shows a bright field image from a Transmission Electron Microscope (TEM) analysis of a plane view in the Ti(C,N) layer of sample B. The plane view is of a distance of about 6 μm from the substrate-coating interface.
Figure 12:
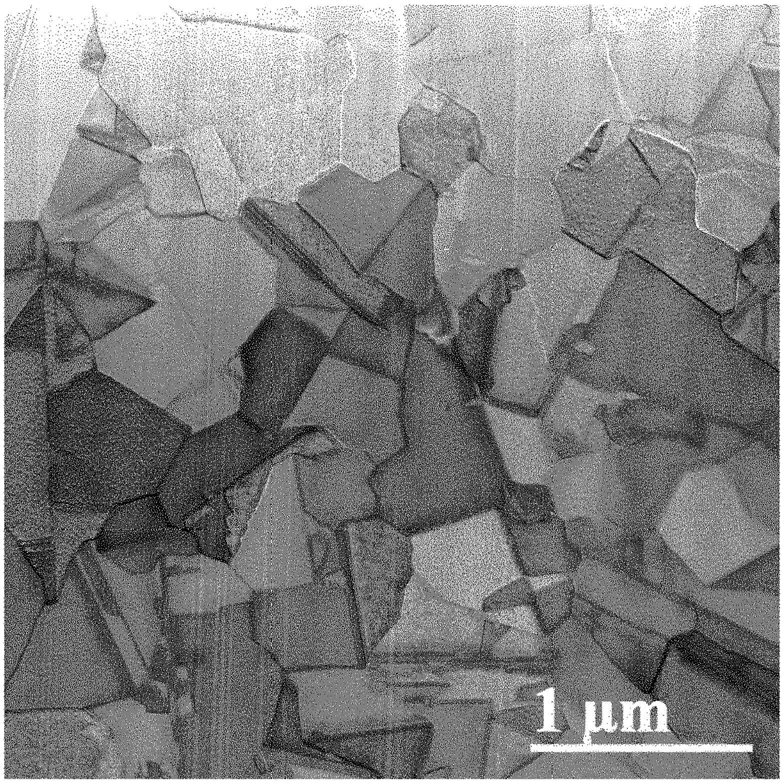
FIG. 12 shows a bright field image from a Transmission Electron Microscope (TEM) analysis of a plane view in the Ti(C,N) layer of sample C. The plane view is of a distance of about 6 μm from the substrate-coating interface.

The grain size of the Ti(C,N) in the samples were also studied via TEM images of a plane view of the Ti(C,N) layer. Cross-sections of each sample were first prepared by cutting the insert in the middle and thereafter polishing the cross-sections. FIB (focused ion beam) lamellae were then taken from the Ti(C,N) coating parallel to the substrate surface, at about 6 μm from the coating-substrate interface using a lift-out technique. The lamellae were thinned using an ion beam until electron transparency was achieved. Bright-field scanning TEM images were acquired on a ThermoFisherScientific Titan transmission electron microscope operated at 300 kV. TKD (transmission Kikuchi diffraction) maps were collected with an Oxford Aztec system installed on a ThermoFisherScientific Helios FIB-SEM. The IPF (inverse pole figure) maps with grain boundary overlay were produced with AztecCrystal software. The bright field images are shown in FIGS. 10-12. The TKD images are shown in FIG. 7-9. It can be seen that there is a distribution in grain size in all samples. It can also seen that the Ti(C,N) in sample A shows smaller grains than the Ti(C,N) in sample B.

Cutting Test 1

The cutting tools were tested in a longitudinal turning operation in a work piece material of SS2310, a high alloyed steel. The cutting speed, $V_c$, was 125 m/min, the feed, $f_n$, was 0.072 mm/revolution, the depth of cut, $a_p$, was 2 mm and water miscible cutting fluid was used. The machining was continued until the end of life time criterion was reached. One cutting edge per cutting tool was evaluated.

The tool life criterion was set to: for the primary or secondary flank wear >0.3 mm or for the crater area >0.2 $mm^2$. As soon as any of these criteria were met the lifetime of the sample was considered reached. The result of the cutting test is presented in Table 4.

TABLE 4

Cutting test 1 results

| Sample | Lifetime [min] | Criterion setting lifetime |
|---|---|---|
| A | 84 | Secondary flank wear |
| B | 52 | Secondary flank wear |
| C | 40 | Primary flank wear |

As can be seen in Table 4 the sample A shows an unexpectedly high wear resistance with a lifetime close to the double as compared to the samples B and C.

Cutting Test 2

The cutting tools were also tested in an intermittent face turning operation in a square bar 100*100 mm work piece material of SS1672 steel. The cutting speed, $V_c$, was 250 m/min, the feed, $f_n$, was 0.1 mm/revolution, the depth of cut, $a_p$, was 2.5 mm and water miscible cutting fluid was used. The machining was continued until the end of lifetime criterion was reached. One cutting edge per cutting tool was evaluated.

In evaluating the tool wear the % of damage of the primary edge line was measured along the contact length where the primary edge had been in contact with the workpiece material. The tool life criterion was set to >40% damage such that the substrate was exposed along the primary edge line in the area of contact with the work piece material. The tool wear was measured every three cycles, i.e. after three facing passes. As soon as the criteria was met the lifetime of the tool was considered reached. To calculate the final tool life of 40% damage a simple interpolation between the damage before and after reaching 40% of damage was made. The average results of 4 parallel cutting tests per type of sample are presented in Table 5. Occasionally, cutting edge breakage was observed, these were removed from the results. Only samples showing continuous wear and thereby reflecting the contribution from the coating on the tool life, are included here.

TABLE 5

Cutting test 2 results

| Sample | Lifetime [cycles] |
|---|---|
| A | 24.2 |
| B | 15.7 |
| C | 7.2 |

While the invention has been described in connection with various exemplary embodiments, it is to be understood that the invention is not to be limited to the disclosed exemplary embodiments, on the contrary, it is intended to cover various modifications and equivalent arrangements within the appended claims. Furthermore, it should be recognized that any disclosed form or embodiment of the invention may be incorporated in any other disclosed or described or suggested form or embodiment as a general matter of design choice. It is the intention, therefore, to be limited only as indicated by the scope of the appended claims appended hereto.

The invention claimed is:

1. A cutting tool for metal cutting comprising:

a substrate at least partially coated with a 3-30 um coating, said substrate being cemented carbide, cermet or ceramic, said coating having one or more layers, wherein at least one layer is a Ti(C,N) layer with a thickness of 3-25 um, said Ti(C,N) layer being composed of columnar grains, wherein an average grain size $D_{422}$ of the Ti(C,N) layer is measured with X-ray diffraction with CuKα radiation, the grain size $D_{422}$ being calculated from a full width at half maximum (FWHM) of the peak according to Scherrer's equation $$D_{422} = \frac{K\lambda}{B_{422}\cos\theta}$$

wherein $D_{422}$ is a mean grain size of the Ti(C,N) grains in the Ti(C,N) layer, K is a shape factor here set at 0.9, 2 is a wavelength for the $CuK\alpha_1$ radiation here set at 1.5405 A, $B_{422}$ is a FWHM value for the reflection and θ is a Bragg angle, and wherein $D_{422}$ is ≥25 nm and ≤33 nm.

2. The cutting tool according to claim 1, wherein the ratio C/(C+N) in the Ti(C,N) layer is 50% to 70%.

3. The cutting tool according to claim 1, wherein the coating includes an innermost layer of TiN.

4. The cutting tool according to claim 1, wherein the Ti(C,N) layer is an outermost layer of the coating.

5. The cutting tool according to claim 1, wherein the cutting tool is a drill, a milling insert or a turning insert.

6. The cutting tool according to claim 1, wherein said at least one Ti(C,N) layer having a thickness of 4.5-25 um exhibits an X-ray diffraction pattern, as measured using CuKα radiation and θ-2θ scan, wherein the TC(hkl) is defined according to Harris formula:

$$TC(hkl) = \frac{I(hkl)}{I_0(hkl)}\left[\frac{1}{n}\sum_{n=1}^{n}\frac{I(hkl)}{I_0(hkl)}\right]^{-1}$$

where I(hkl) is a measured intensity (integrated area) of the (hkl) reflection, $I_0$(hkl) is a standard intensity according to ICDD's PDF-card No. 42-1489, wherein the standard intensities $I_0$(hkl) are:

(111): 100; (200): 46; (220): 62; (311): 100; (331): 29; (420): 21; (422): 28; and n is a number of reflections, the reflections used in the calculation being (1 1 1), (2 0 0), (220), (3 1 1), (3 3 1), (4 20) and (4 2 2), wherein TC(422)>3.

7. The cutting tool according to claim 6, wherein said at least one Ti(C,N) layer has a thickness of 6-25 um and TC(422)≥4.

8. The cutting tool according to claim 6, wherein said at least one Ti(C,N) layer exhibits an X-ray diffraction pattern, wherein the TC(422) is the highest and TC(311) is the second highest.

* * * * *